(12) United States Patent
Nygaard, Jr.

(10) Patent No.: US 6,785,622 B2
(45) Date of Patent: Aug. 31, 2004

(54) METHOD AND APPARATUS FOR PERFORMING EYE DIAGRAM MEASUREMENTS

(75) Inventor: Richard A Nygaard, Jr., Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 35 days.

(21) Appl. No.: 10/020,673

(22) Filed: Oct. 29, 2001

(65) Prior Publication Data

US 2003/0083833 A1 May 1, 2003

(51) Int. Cl.[7] .............................................. G06G 7/02
(52) U.S. Cl. ......................... 702/67; 702/57; 702/64; 702/66; 702/69; 702/78; 702/79
(58) Field of Search .............................. 702/57, 58, 64, 702/66, 67, 69, 78, 79, FOR 104, FOR 106, FOR 107, FOR 108–110; 324/76.11, 76.12, 76.13, 76.15, 76.16, 76.19, 76.22, 76.27, 76.35, 76.39, 76.41, 76.47, 76.48; 375/354, 355, 359, 360

(56) References Cited

U.S. PATENT DOCUMENTS

| | | | | | |
|---|---|---|---|---|---|
| 4,445,192 | A | * | 4/1984 | Haag et al. | 345/418 |
| 5,162,723 | A | * | 11/1992 | Marzalek et al. | 324/76.19 |
| 5,210,712 | A | * | 5/1993 | Saito | 708/819 |
| 5,247,544 | A | * | 9/1993 | LaRosa et al. | 375/371 |
| 5,400,370 | A | * | 3/1995 | Guo | 375/371 |
| 5,978,415 | A | * | 11/1999 | Kobayashi et al. | 375/230 |
| 6,256,342 | B1 | * | 7/2001 | Schlag et al. | 375/229 |
| 6,377,642 | B1 | * | 4/2002 | Dollard | 375/355 |

* cited by examiner

Primary Examiner—Hal Wachsman
Assistant Examiner—Carol S. W. Tsai
(74) Attorney, Agent, or Firm—Edward L. Miller

(57) ABSTRACT

An eye diagram analyzer equips each SUT data and clock signal input channel with individually variable delays in their respective paths. For a range of signal delay of n-many SUT clock cycles, the SUT clock signal delay might be set at about n/2. For each data channel there is specified a point in time relative to an instance of the delayed clock signal (data signal delay) and a voltage threshold. The specified combination (data signal delay, threshold and which channel) is a location on an eye diagram, although the trace may or may not ever go through that location. A counter counts the number of SUT clock cycles used as instances of the reference for the eye diagram, and another counter counts the number of times the specified combination of conditions was met ("hits"). After watching a specified combination for the requisite length of time or number of events, the number of SUT clock cycles involved and the associated number of hits are stored in memory using a data structure indexed by the components of the specified combination (data signal delay, threshold). Next, a new combination of data signal delay and threshold is specified and a measurement taken and recorded in the data structure. The process is repeated until all possible combinations within a stated range of data signal delay and threshold voltage (using specified resolution/step sizes for delay and voltage) have been investigated. As this process proceeds under the control of firmware within the logic analyzer, other firmware can be examining the data structure and generating a partial eye diagram visible on a display, and that will be complete soon after the measurement itself is finished.

1 Claim, 4 Drawing Sheets

METHOD AND APPARATUS FOR PERFORMING EYE DIAGRAM MEASUREMENTS

REFERENCE TO RELATED APPLICATION

The subject matter of the present Application includes a transition detection circuit usable in a logic analyzer adapted to perform eye diagram measurements, or in a stand-alone circuit for that purpose. And although we disclose herein the general nature of such a detector in sufficient detail to allow a complete understanding of the invention, the actual circuit has complexity beyond what is needed here and is capable of performing additional functions. That actual circuit is the subject matter of a U.S. Pat. No. 6,463,392 entitled System and Method for Adjusting a Sampling Time in a Logic Analyzer, filed on Aug. 16, 1999 by Richard A. Nygaard et. al. issued Oct. 8, 2002 and assigned to Agilent Technologies, Inc. Because the subject matter of that Application is of interest to that of the present invention, and for the sake of brevity herein, "System and Method for Adjusting a Sampling Time in a Logic Analyzer" is hereby expressly incorporated herein by reference.

BACKGROUND OF THE INVENTION

Eye diagrams are a conventional format for representing parametric information about signals, and especially digital signals. We shall refer to an item of test equipment or a measurement circuit arrangement that creates an eye diagram as an eye diagram tester, whether it is found in an oscilloscope, a BERT (Bit Error Rate Tester), or, as we shall show how, in a logic analyzer. 'Scopes and BERTs each have their own types of circuit architecture that they use to measure eye diagrams, and thus belong to the class of Eye Diagram Testers. The method and circuit apparatus to be disclosed herein is different than that used in 'scopes and BERTs, and is especially suitable for use within a logic analyzer. We shall call this different method and circuit apparatus an Eye Diagram Analyzer, or EDA for short. By the definitions above, an EDA is a particular type of eye diagram tester.

Although the method and apparatus for an EDA to be described herein is especially suitable for use within the architecture of a logic analyzer, it will be readily appreciated that it could also be used to create a stand-alone eye diagram analyzer (and at a considerable savings in hardware, such as the large acquisition memory, otherwise needed to implement a functioning logic analyzer).

To look ahead briefly, an example eye diagram for a digital signal and composed of traces 3 and 4 is illustrated as part of FIG. 1. It is a composite of many (probably at least thousands, easily millions, and perhaps orders of magnitude more) measurements taken upon separate instances of a signal occurring on a channel of interest. To borrow an idea from the world of oscilloscopes, it is as though an infinite persistence continuous time domain trace were cut apart into lengths corresponding to one, five or ten clock times, and then stacked on top of each other. The vertical axis is voltage, and the horizontal axis represents the difference in time (i.e., an offset) between some reference event 2 and an event of interest. The time axis in the example of FIG. 1 has enough length to depict one complete eye centered about the reference 2, with perhaps an additional one half an eye before and after. In general, the number of cycles shown depends upon how the measurement is set up, and could be a large number. In this diagram the reference 2 represents the expected point in time when the value of an applied data signal would be captured by some receiving circuit in an SUT (System Under Test), and is derived from an application of the SUT's clock to the Eye Diagram Analyzer.

The traces 3 and 4 are the substance of the eye diagram, and represent various combinations of circumstances that occurred in the data signal being characterized (which data signal is also applied to the EDA). For example, consider the circular region 5 about trace 4. That region loosely represents the combination of a specified voltage at such and such a time relative to the SUT's clock signal, and which might suggest to us that a signal of interest is achieving a proper voltage at a proper time. In our example the trace 4 does indeed transit the circle 5 (note that the circle is merely an annotation or legend within the figure, and not part of any actual eye diagram), which indicates that there actually were times when the data signal had fully (or almost) transitioned at the time indicated relative to when the clock signal finished its transition from one value to the other (which in this case is about a half-cycle ahead of the clock). We also note that another region, say 8, is not transited by the trace, which if that were indeed to happen, would presumably be an indication of trouble. Thickening of the traces 3 and 4 are indicative of jitter, and illuminated pixels detached from the trace, or, line segments that go through the otherwise empty middle of the eye, are generally indications of unfavorable conditions. An eye diagram cannot reveal which isolated instance of the signal caused an exception, as other types of measurements might, but it does provide timely valid information about how a system is operating.

Although eye diagrams go back a long way and were originally made with analog 'scopes, such 'scopes are just not up to the task of performing that function with today's high speed digital signals, and need not be further considered. Digital oscilloscopes are presently often used to generate eye diagrams.

Digital oscilloscopes operate in various ways with regard to when they decide to sample an input voltage and then measure the voltage at the time of the sample (high speed sequential sampling of solitary events, regular repetitive sampling of periodic signals, random repetitive sampling, etc.) In whatever way it is done, the result is many individual points expressed as pairs of numbers (time, voltage) that must be stored in some sort of acquisition memory and then later interpreted to produce an eye diagram.

BERTs have also been used to generate eye diagrams. A BERT does not have the digitizing ability of the digital oscilloscope. It can determine whether an input signal and a known good reference signal have each crossed a threshold $V_T$ at various times along a sweep for a delayed clock, and if the resulting logical values are in agreement or not. The value for $V_T$ is also swept. They thus accumulate numbers of data errors on single points that are transitions of $V_T$ at swept points in time, which can then be interpreted to create an eye diagram.

Logic Analyzers have heretofore not been capable of generating eye diagrams, as the internal architecture of a conventional logic analyzer does not immediately lend itself to that task. As the popularity of eye diagrams increases, however, it has become increasingly desirable that logic analyzers be equipped to perform this task. The question becomes how to do so economically and take maximum advantage of the resources already present for logic analysis purposes. It would also be desirable if there were a low cost technique for implementing a stand-alone eye diagram analyzer. What to do?

SUMMARY OF THE INVENTION

A logic analyzer can be equipped to perform eye diagram measurements by equipping each SUT clock signal input and each SUT data signal input channel with individually variable delays in their respective signal paths. If the range of signal delay is, say, n-many SUT clock cycles, then the SUT clock signal delay might be set at about n/2. For each data channel that is to undergo eye diagram measurement, there is specified some combination of a point in time relative to an instance of the delayed clock signal (data signal delay) and a voltage threshold. The specified combination (data signal delay, threshold) is essentially a location on an eye diagram, although the trace may or may not ever go through that location. There is also specified how many times this specified combination will be watched before another such combination is invoked. As the SUT runs, a particular specified combination will occur always, sometimes or never. A counter counts the number of SUT clock cycles used as instances of the reference for the eye diagram, and another counter counts the number of times the specified combination of conditions was met (hereinafter called "hits"). After watching a specified combination for the requisite length of time or number of events, the number of SUT clock cycles involved and the associated number of hits are stored in memory using a data structure indexed by the components of the specified combination (data signal delay, threshold and which channel). Next, a new combination of data signal delay and threshold is specified and a measurement taken and recorded in the data structure. The process is repeated until all possible combinations within a stated range of data signal delay and threshold voltage (using specified resolution/step sizes for delay and voltage) have been investigated. The range of data signal delay might be as large as from zero to n-many SUT clock cycles (which would be n/2 before and after the delayed reference), or it could be some lesser amount. As this process proceeds under the control of firmware within the logic analyzer, other firmware can be examining the data structure and generating a partial eye diagram visible on a display, and that will be complete soon after the measurement itself is finished. This technique can also be used to implement a stand alone eye diagram analyzer.

DESCRIPTION OF A PREFERRED EMBODIMENT

Figure 1:
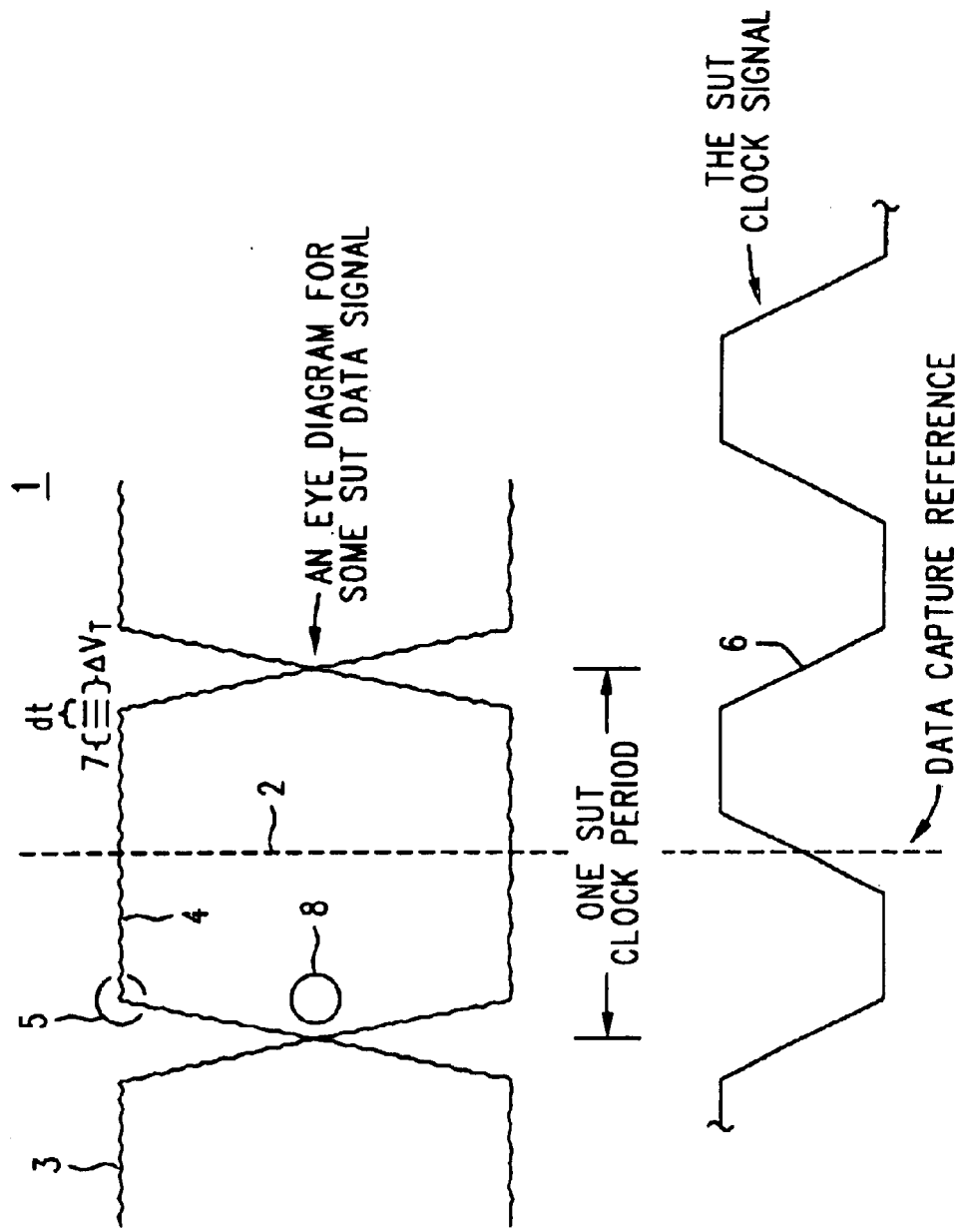
FIG. 1 is an example eye diagram measured by an eye diagram analyzer constructed in accordance with the invention.

Refer now to FIG. 1, wherein is shown, for some SUT data signal (not shown), an eye diagram 1 composed of traces 3 and 4 presented in relation to a reference time 2. The reference time indicates when, in relation to an SUT clock signal 6, data is captured. As will become apparent as the discussion proceeds, the three vertically stacked horizontal lines 7 play an explanatory part in describing how the eye diagram of FIG. 1 is measured and produced. We shall have much more to say about this later, but for now it is sufficient to note that the vertical distance between the horizontal lines 7 represents a change between successive threshold voltages $V_T$ for the comparator to which the input data signal is applied. We call that change in threshold voltage $\Delta V_T$. It will be noted that the horizontal line segments 7 have horizontal length. That length represents a time interval, or dt. The duration of the time interval dt can be specified, as can when it starts relative to the data capture reference 2. A "hit" occurs when it is noticed that, for a particular value of $V_T$ in place at the moment, a data signal input voltage comparator has changed its indicated comparison sometime during the time interval dt. A hit increments a counter. We leave a given combination of $V_T$ and offset for dt in place until a specified duration or number of clocks has passed. This is called a "run", at the conclusion of which the number of hits (possibly along with some other things) is stored in a data structure indexed by $V_T$ and the offset (and, when there are more that one channel being measured, by the channel identifier). A measurement for an eye diagram is a series of runs. According to some paradigm, the $V_T$ in use and the offset for dt is varied between runs, until conditions at all possible combinations of $V_T$ and offset dt have been examined. For example, one might sweep $V_T$ linearly from one extreme to another by $\Delta V_T$ with a given offset for dt. (In terms of the figure, this would mean that there would be many more than just three stacked horizontal lines 7, but an entire column, instead. We didn't draw it that way for simplicity and clarity, but that is how it generally is.) At the conclusion of the column we pick another offset and sweep through another column of $V_T$ values. (Again, in terms of the figure, this would be shown as adjacent columns covering the entire horizontal extent of the eye diagram. If we had drawn it that way, the traces 3 and 4 would be effectively obscured, so we didn't.)

After the numbers of hits have been acquired for all those combinations of interest that have been measured, the data structure contains information that can be used to create an eye diagram. We note also that starting production for the displayed eye diagram need not necessarily wait until the entire data structure is filled, and that as far as the completed data structure is concerned, it really does not matter in what order its elements were filled. Hence, we might step the offset for dt for fixed, but suspicious, values of $V_T$ more rapidly than we vary $V_T$ about the suspicious region, in hopes of performing a quick, but limited, investigation of what is going on. This last property of the eye diagram analyzer is not trivial. Other techniques can sometimes take a very long time (much more than for a cup of coffee!) to produce useful indications in the display.

Figure 2:
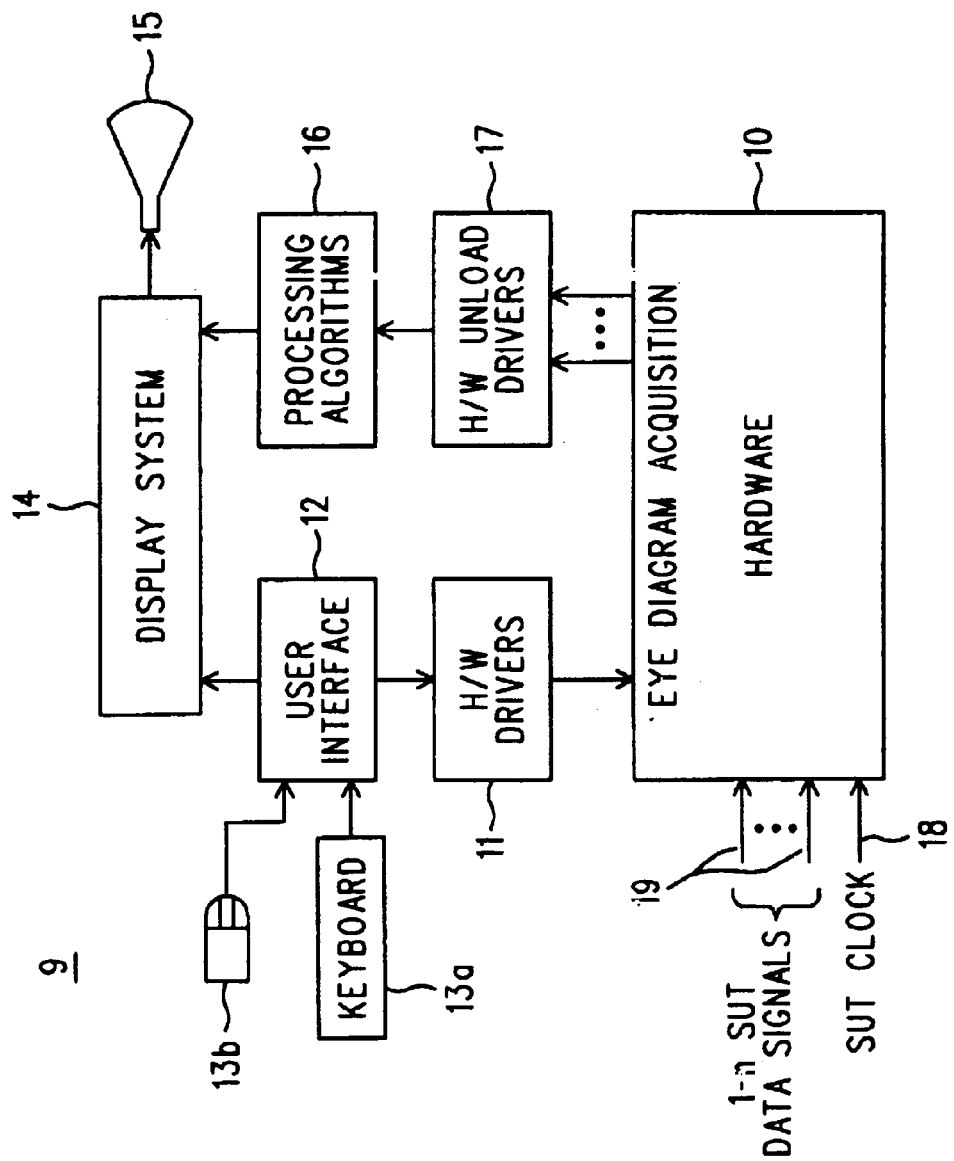
FIG. 2 is a simplified partial block diagram of portions of an eye diagram analyzer arranged to perform eye diagram measurements.

Refer now to FIG. 2, which is a simplified block diagram 9 of an eye diagram analyzer, which may be either a stand-alone unit or incorporated into a logic analyzer (additional details for which are not shown). At the core of the block diagram 9 is some EYE DIAGRAM ACQUISITION HARDWARE 10, which receives an SUT clock signal 18 and one to n-many SUT data signals (19) for which eye diagram measurements are desired. In a logic analyzer setting there may be upwards of one hundred and twenty SUT data signals.

The EYE DIAGRAM ACQUISITION HARDWARE is configured for each run by H/W DRIVERS 11 that are essentially firmware routines executing on some processor (not shown). This configuration principally involves some calibration or other zero time offset characterization (to combat the effects of temperature induced drift), specifying a dt and its offset (the offset often changes from run to run—dt usually stays fixed at some selected value), and a value for $V_T$. Additional things to be in specified can include a count associated with some condition or activity, such that if the count is reached (or exhausted by counting down) the end of the run is indicated.

All those things that are specified to the EYE DIAGRAM ACQUISITION HARDWARE 10 with the H/W DRIVERS 11 (except for the automatic calibration at the beginning of each run) originate with operator inputs made through a USER INTERFACE 12 using input devices, such as keyboard 13a and a mouse 13b. Part of the USER INTERFACE 12 involves displaying suitable images for prompting and informing the operator of choices and results. These images are presented by a DISPLAY SYSTEM 14 driving a CRT 15, which is, of course, viewed by the operator. To this end the USER INTERFACE 12 is coupled to the DISPLAY SYSTEM 14.

Also coupled to the DISPLAY SYSTEM 14 is a collection of PROCESSING ALGORITHMS 16 executing in firmware and that is coupled to receive data from a collection of H/W UNLOAD DRIVERS 17. Their job is to get the values of the various counters and the indications of run completion out of the hardware elements (registers, counters, etc.) and into the PROCESSING ALGORITHMS for entry into the data structure, and from whence the results, formatted as an eye diagram, are conveyed to the DISPLAY SYSTEM 14 for presentation on the CRT 15.

Figure 3:
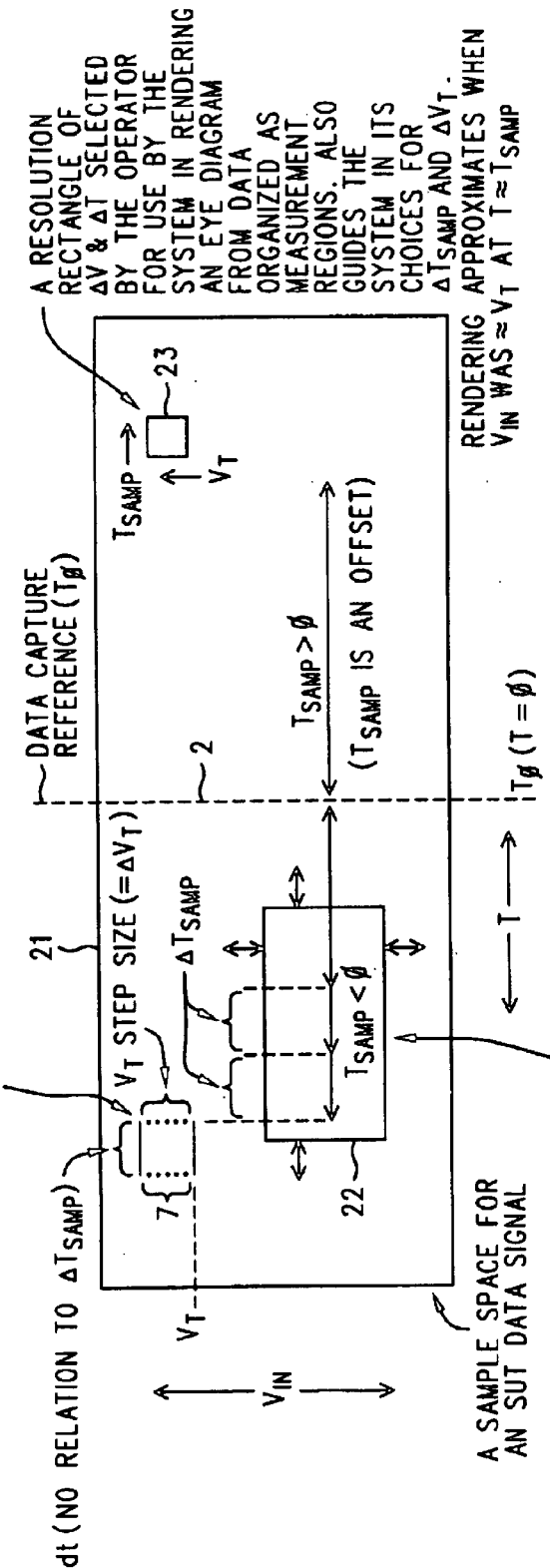
FIG. 3 is a simplified diagram illustrating certain concepts used in taking the measurements needed to produce an eye diagram using the arrangement of FIG. 2.

Refer now to FIG. 3, wherein is depicted a diagram 20 showing various relationships of interest. To begin, note the region 21. It is a sample space for an SUT signal of interest. It dimensions are a span of time in the horizontal direction and voltage in the vertical direction. The sample space 21 corresponds to the earlier mentioned data structure that is indexed by $V_T$ and the time offset. The vertical direction corresponds to the various possible values that $V_T$ can take, and might have an extent of four volts, or so. The horizontal direction might represent five nanoseconds of activity for the highest permitted SUT clock speeds of 1,500 megacycles per second, or eight nanoseconds at 800 mc.

The sample space has a maximum size, based on the amount of memory available to form the data structure. There is quite a bit of memory allocated for the data structure, but if, say because there are many channels being measured, provision has been made for it to expand into a mass storage device, such as a disc. It may be the case that when the disc is being used things run a little slower overall. This is not fatal, and in particular, it does not interfere with performance during a run, where all that needs to happen as far as data storage is concerned is the incrementing and decrementing of some counters. It will be seen that these counters are provided for each channel on a channel by channel basis, anyway, so making a measurement on a large number of channels does not aggravate this situation, either. At worst the time required to deal with the counts, which is done between runs, is increased if it is necessary to write to the disc. But we are under no obligation to limit the time for overhead between runs to some small duration.

The sample space 21 is populated with values (numbers of hits, number of clock cycles measured) by performing runs. Note the horizontal lines 7. These correspond to those shown as part of FIG. 1. We call each line a "measurement region" that represents a value for $V_T$, with adjacent lines being $\Delta V_T$ apart. The length of each line (measurement region) represents the duration dt during which a transition of the input signal through $V_T$ will be recorded as a hit. Thus, each such line segment represents a combination of $V_T$ and dt at some time offset from a reference. The location of one end of the line segment for such a combination is a time offset from the data capture reference 2, which reference 2 we now designate as $T_0$. The offset itself we designate as $T_{SAMP}$. Note that $\Delta T_{SAMP}$ is the step size of $T_{SAMP}$, and that it is not the same as dt. The parameter dt is a duration for which we are sensitive to a transition through $V_T$. Where dt is we call $T_{SAMP}$. Where the next dt starts does not have to be a full dt away from where it used to be, or it might be so exactly, or it might be a lot further away. These changes in position of dt ($\Delta T_{SAMP}$) are not related to the size of dt. We provide much more flexibility in specifying $\Delta T_{SAMP}$ than we do dt, the wisdom of which will be appreciated upon reflection.

The parameters $\Delta V_T$, the upper and lower limits for $V_T$, $\Delta T_{SAMP}$ and its upper and lower limits, originate with selections made by the operator, who is presented choices by the USER INTERFACE 12 that are stated in terms of the desired resolution for the eye diagram itself. That is, the operator is asked to specify a "resolution rectangle" 23, that may be thought of as a template to be used in mosaic style to impose a grid onto the sample space, within which events are quantized and regarded as indistinguishable. In a preferred embodiment the range of times for the resolution rectangle is 10–100 psec, while the range for voltage is 1–100 mv. The USER INTERFACE 12 makes the most rational correspondence between the selections made for the resolution rectangle 23 and values for $\Delta T_{SAMP}$ and $\Delta V_T$ that are actually supported by the EYE DIAGRAM ACQUISITION HARDWARE 10. Once $\Delta T_{SAMP}$, $\Delta V_T$ and the limits for $V_T$ and $T_{SAMP}$ are known, the correspondence to the memory of the data structure is thus determined, and the "real" units for the sample space 21 are likewise thus determined. The operator also gets to select one of four values for dt, and the length of the run in terms of a number of SUT clock cycles. At this point the runs to populate the data structure can begin when desired.

Now it may happen (and it often will) that the size and resolution afforded by the sample space and the data structure exceed the information capacity needed to produce a particular eye diagram of interest, but that after a measurement is complete, the location of interest within the sample space may change, or the size of the area of interest may change. The operator would like to zoom and pan amongst the acquired data. To accommodate this, the operator is invited to specify a field of view 22 of selectable size. The field of view 22 is rather like a clip window in a graphics system for a graphics workstation. One of the main tasks of the PROCESSING ALGORITHMS 16 is to render as an eye diagram that portion of the data structure that corresponds to the field of view 22, according to the specified resolution rectangle.

The rendering process involves the following ideas. Just as the field of view 22 is a window into the sample space/data structure, a certain portion of the displayable collection of pixels (on the CRT screen, page of printer paper, etc.,) have been allocated for display of the eye diagram. A supervisory process internal to the EDA, operating in cahoots with the operator, makes this choice. Clearly, if eye diagrams for five channels are to displayed in a given (X, Y) region of the display's raster, less space is available for each eye diagram than if there are only two channels, instead. The number of display pixels in X and Y available to represent an individual eye diagram, in conjunction with the size of the field of view 22, allow the determination of a correspondence between those pixels and the time/voltage data entries of interest in the data structure. The correspondence can be one-to-one, or many-to-one in either direction. Also, the nature of the correspondence need not be integral. The rendering process examines all these correspondences to determine which pixels in the displayed eye diagram are to be illuminated.

Places in the eye diagram that have different numbers of hits may be illuminated differently than those that have just a few. It may be the case, for example, that a solitary hit or small number of hits is very important hard-to-find information, and should be prominently displayed. On the other hand, there can be other times when the rendering of the trace should reflect how prevalent the corresponding occurrences are, and the data are construed as a fraction (number of hits out of how many measured clock cycles). Selecting trace intensity and color as a function of such things are part of the rendering process, and occur in response to modes of operation and parameters specified by the operator. To be sure, this rendering is a complicated task, but nonetheless it is performed in a way that is already known in itself.

Figure 4:
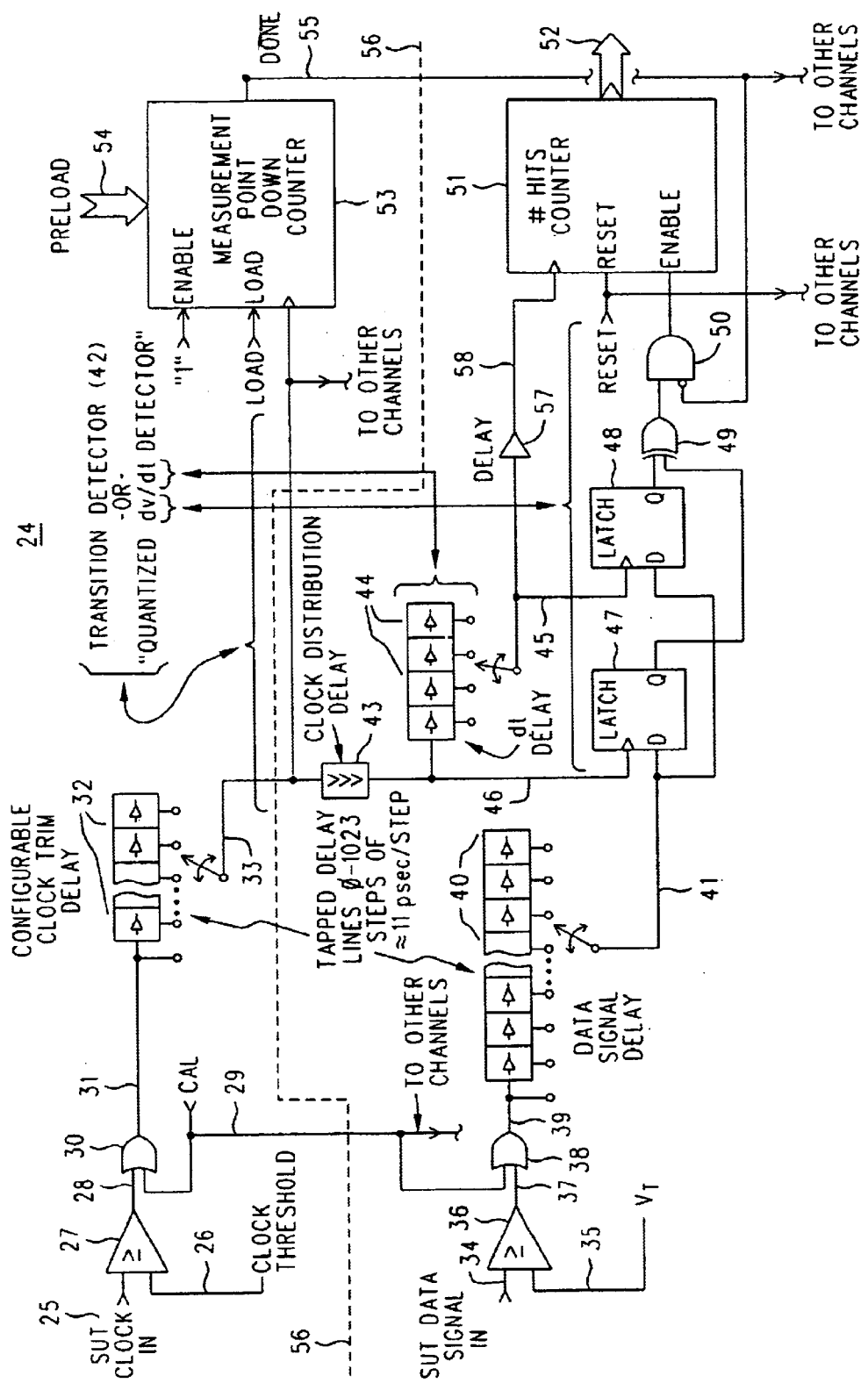
FIG. 4 is a simplified block diagram of the eye diagram analyzer measurement circuitry used to acquire data from an SUT clock signal and one channel of SUT data signal for the production an eye diagram.

Refer now to FIG. 4, which is a simplified block diagram 24 of the measurement hardware associated with each SUT data signal that can be the subject of an eye diagram measurement. What is shown in the figure is one SUT clock section above dotted line 56 and one SUT data signal section below dotted line 56. This would accommodate a single channel measurement. It will be appreciated that for additional channels there would remain the single SUT clock section, while additional corresponding data signal sections would be added, one for each channel. In connection with this, we have shown certain signals (a RESET, DONE, CAL and a delayed clock) that are sent to any additional data signal channels.

The SUT clock input 25 is applied, along with a clock threshold voltage 26, to the inputs of a comparator 27. The nature of the comparator is that it produces an output 28 whenever the SUT clock input 25 is greater than or equal to the clock threshold voltage 26. The operator can specify the clock threshold voltage.

In similar fashion, the SUT data signal input 34 is applied, along with a (possibly channel specific) data threshold voltage $V_T$ 35, to the inputs of a comparator 36. The nature of the comparator is that it produces an output 37 whenever the SUT data signal input 34 is greater than or equal to the threshold voltage $V_T$ 35. The operator can specify the threshold voltage $V_T$.

In a preferred embodiment all this circuitry is implemented within an IC. The effective values of the thresholds, as well as those of the various to delays to be encountered, are somewhat a function of temperature and other causes of drift. To minimize the mischief caused by such drifts we prefer to frequently adjust one of the variable delays (to be discussed below) to produce an indication of simultaneity (zero relative delay) under an imposed controlled condition. That controlled condition is that comparator output signals 28 and 37 transition at the same time. Rather that disturb the circuitry of the comparator (which is practical) we show OR gates 30 and 38 that allow a CAL signal 29 to accomplish the same effect. So, at the start of each run we arrange that the two comparators 27 and 36 will not otherwise produce an output (very high thresholds, remove an ENABLE signal or turn off something upstream in the signal paths, etc.) and apply a suitable square wave CAL signal 29. We do that continuously until some adjustment (described in due course) produces a satisfactory result (a close approximation of zero relative delay).

To continue, then, the output of OR gate 30 is signal 31, which is applied to a CONFIGURABLE CLOCK TRIM DELAY circuit 32. We have shown this circuit 32 as though it were a cascaded series (say, one thousand twenty-three in number) of non-inverting buffers whose input and series of successive outputs are selected by a switch (as in a MUX) to become a variably delayed version 33 of the input. Each buffer has the same delay, which is somewhere in the ten to twelve picosecond range. Let us call the delayed output a partially delayed clock signal.

The series of cascaded non-inverting buffers is a good way of achieving the needed functionality, which is that of an electrically variable delay line. In particular, for a digital signal it mimics the ability of an actual analog delay line to impart phase delay to an entire waveform, which is the basis for our being able to position dt at a location many cycles away from $T_0$. This is something a mere pulse delay circuit could not do. A cascaded series of buffers is not infinitely variable, however, and the quantizing of the delay according to a stage of buffering limits the ultimate bandwidth. No matter, we can live with both effects, since we are dealing with clocked digital signals in what ought to be a synchronous environment. The extra "continuity" that a genuine delay line (e.g., a long transmission line) would afford is not a necessity in making our eye diagram measurements.

Since there is to be but one clock signal for however many data channels are involved, the output 33 from the CONFIGURABLE CLOCK TRIM DELAY circuit 32 must be distributed to the vicinity of the data signal hardware (the stuff below line 56) for those however many channels, some of which may be in different ICs or on different printed circuit assemblies. The significance of this is that there are different delays in getting the partially delayed clock signal 33 to where its needed within each channel. We represent this by the box 43 labeled CLOCK DISTRIBUTION DELAY. The output of box 43 (there is no lumped delay there—the lumped delay is an equivalent to the distributed delay that is real, but awkward to show) might be termed the real delayed clock signal. It is the case that the CLOCK DISTRIBUTION DELAY is not the same amount for each channel, but they are within, say, five percent of each other. So, the various 'real delayed clock signals' are not truly simultaneous, but we can live with that, since it is going to turn out that we need to zero for relative delay within each channel, but do not fill need to zero for simultaneity across channels.

Return now to the data signal path below line 56, which, it will be recalled, is for one channel. The output 39 of OR gate 38 is applied to another tapped delay line (DATA SIGNAL DELAY) 40 that is of the same nature as the CONFIGURABLE CLOCK TRIM DELAY circuit 32. Its output 41 is applied to the D input of a latch 47 that is clocked by that channel's real delayed clock signal 46.

Before proceeding, let's pause a moment and take care of the CAL situation. After that it will make sense to describe how the tap settings for the two delay lines 32 and 40 are selected for a run. Assume now that the CAL signal (a square wave of convenient frequency) is present. Let the CONFIGURABLE CLOCK TRIM DELAY circuit 32 be at some tap. Now, considering the CLOCK DISTRIBUTION DELAY for each channel, it is possible to adjust the DATA SIGNAL DELAY circuit 40 so that latch 41 has stable and different values about one setting of the tap for the DATA SIGNAL DELAY circuit 40. We'd like that tap to be about in the middle of 1024 possible positions, so we vary the tap for the CONFIGURABLE CLOCK TRIM DELAY circuit 32 to get the tap for circuit 40 about in the middle. What's more, there are likely several (or a great many) data channels in use, so we can't get them all the same, since the various associated CLOCK DISTRIBUTION DELAYS are likely all somewhat different. But they are distributed about some average value, so that for the group, we can pick a tap for the CONFIGURABLE CLOCK TRIM DELAY circuit 32 such that the CAL setting for the taps of the various DATA SIGNAL DELAY circuits are each near their middle. The effect oft his compromise will be that not every data channel will have the same range of relative delay available (we will use that relative delay to make the offset from TO), but there is still plenty, anyway, so that is what we do.

To resume the discussion of how to make a run, each channel further delays its copy of the real delayed clock signal 46 to produce a doubly delayed clock signal 45. This is accomplished by a dt delay circuit 44 of, say, four tapped delays of 70 ps, 120 ps, 170 ps and 220 ps. The doubly delayed clock signal 45 clocks a latch 48 whose D input is also the (same) delayed data signal applied to latch 47. The idea is that if the two latches 47 and 48 have different values (detected by XOR gate 49) after both have been clocked, then the SUT DATA INPUT SIGNAL 34 must have transitioned through $V_T$ sometime during the interval between when latch 47 was clocked and latch 48 was clocked. Accordingly, it will be noted that in FIG. 4 this collection of circuitry is termed a TRANSITION DETECTOR (42). We have called that time interval dt in connection with FIGS. 1 and 3. The value of dt is the delay provided by the dt delay circuit 44.

It will be recalled that dt is a sampling window in time whose location is at an offset $T_{SAMP}$ from $T_0$. (See FIG. 3.) It will now be clear that $T_0$ is the CAL condition we set out above (zero relative delay between the signals 41 and 46), and that by varying the tap of the DATA SIGNAL DELAY circuit 40 in both directions we create signed amounts of the offset $T_{SAMP}$ (i.e., we invoke values of $\Delta T_{SAMP}$).

The output of XOR gate 49 is applied, through AND gate 50, to an ENABLE input of a # OF HITS COUNTER 51, which may be reset at the beginning of each run. The # OF HITS COUNTER 51 is clocked (made to count if enabled) by a signal 58 that is a delayed (by delay 57) version of the doubly delayed clock signal 45. The extra delay 57 allows latch 48, XOR gate 49 and AND gate 50 to get set up (which, if it happens, enables the counter to count).

The run continues until enough SUT clock cycles have been examined. That number is determined by a value 54 that is pre-loaded into a MEASUREMENT POINT DOWN COUNTER 53 at the start of the run. Each SUT clock cycle decrements the pre-loaded count by one. When it reaches zero a signal DONE 55 is generated, which, among other things signals the EDA system supervisor that the run is complete and removes the ability to enable the # OF HITS COUNTER 51.

At this time the value 52 accumulated in the # OF HITS COUNTER 51 is stored by the EDA system in the indexed location of the data structure, along with any other information deemed useful, such as the value of 54 of the pre-load for counter 53. It will be noted that the block diagram 24 suggests that this happens in an instance by instance manner. It will also be appreciated, however, that while the block diagram gives the proper functionality to be obtained, it is often desirable for performance reasons to employ additional techniques such as pipelines, parallelism and MUX'ing of cached results to 'get to run faster than they really do'.

After each run a new combination of $V_T$ and $T_{SAMP}$ are instituted, and another run conducted, until there have been as many runs as needed, or the operator manually indicates that the measurement should be terminated.

I Claim:

1. A method of measuring a data signal to create an eye diagram of that signal, the method comprising the steps of:

(a) setting a hits count to zero;

(b) comparing the instantaneous voltage of a clock signal associated with the data signal to a clock threshold voltage to produce a logical clock signal;

(c) delaying the logical clock signal by a selected first amount to produce a delayed logical clock signal;

(d) comparing the instantaneous voltage of the data signal to be measured to a data threshold voltage to produce a logical data signal;

(e) delaying the logical data signal by a selected second amount to produce a delayed logical data signal;

(f) delaying the delayed logical clock signal by a selected third amount to produce a doubly delayed logical clock signal;

(g) capturing the value of the delayed logical data signal in response to the delayed logical clock signal;

(h) capturing the value of the delayed logical data signal in response to the doubly delayed logical clock signal;

(i) incrementing the hits count each time a value captured in step (g) is different to that captured in step (h);

(j) repeating steps (b) through (i) until a selected condition is satisfied;

(k) subsequent to step (j), storing the count of step (i) in a data structure indexed by the difference between the first and second amounts and by the data threshold voltage;

(l) repeating steps (a) through (k) with different combinations of the data threshold voltage and difference between the first and second amounts; and (m) generating an eye diagram from the hits counts stored in the data structure.

* * * * *

UNITED STATES PATENT AND TRADEMARK OFFICE
CERTIFICATE OF CORRECTION

PATENT NO.   : 6,785,622 B2
DATED        : August 31, 2004
INVENTOR(S)  : Richard A. Nygaard, Jr.

It is certified that error appears in the above-identified patent and that said Letters Patent is hereby corrected as shown below:

<u>Column 5,</u>
Line 1, before "specified", delete "in"

<u>Column 8,</u>
Line 43, before "need to zero", delete "fill"

<u>Column 10,</u>
Line 2, before "54", delete "of"
Line 9, after "'get", insert therefor -- things --

Signed and Sealed this

Second Day of August, 2005

JON W. DUDAS
*Director of the United States Patent and Trademark Office*